US008540563B2

(12) United States Patent
Ghaly

(10) Patent No.: US 8,540,563 B2
(45) Date of Patent: Sep. 24, 2013

(54) INTERACTIVE SLOT MACHINE METHOD AND APPARATUS

(76) Inventor: Nabil N. Ghaly, South Huntington, NY (US)

( * ) Notice: Subject to any disclaimer, the term of this patent is extended or adjusted under 35 U.S.C. 154(b) by 884 days.

(21) Appl. No.: 11/903,417

(22) Filed: Sep. 21, 2007

(65) Prior Publication Data

US 2008/0076524 A1 Mar. 27, 2008

Related U.S. Application Data

(60) Provisional application No. 60/847,132, filed on Sep. 26, 2006.

(51) Int. Cl.
*A63F 13/00* (2006.01)

(52) U.S. Cl.
USPC .................. 463/20; 463/16; 463/17; 463/18; 463/19; 463/21; 463/22; 463/25; 463/31; 463/43

(58) Field of Classification Search
USPC .............................. 463/16–22, 25–27, 41–43
See application file for complete search history.

(56) References Cited

U.S. PATENT DOCUMENTS

| | | | | |
|---|---|---|---|---|
| 5,769,716 | A * | 6/1998 | Saffari et al. | 463/20 |
| 7,040,984 | B2 * | 5/2006 | Mead | 463/16 |
| 7,195,559 | B2 * | 3/2007 | Gilmore et al. | 463/20 |

* cited by examiner

*Primary Examiner* — Sunit Pandya

(57) ABSTRACT

A gaming device that does not employ pay lines is provided, and has a playfield that is subdivided into a plurality of groups. The configuration of the groups could be done manually by the player, or at random, and changes for each game. At least one key group is used to define key symbols that must be repeated at other groups for a winning combination of symbols to occur.

25 Claims, 11 Drawing Sheets

INTERACTIVE SLOT MACHINE METHOD AND APPARATUS

PARENT CASE TEXT

This utility application benefits from provisional application of U.S. Ser. No. 60/847,132 filed on Sep. 26, 2006.

BACKGROUND OF THE INVENTION

This invention relates generally to slot machines, also known as coin operated gaming machines, and more specifically to a category of slot machines that does not require winning lines to determine a winning combination of symbols.

Slot machines are well known, and have been around for many years. Various mechanical reel type slot machines are known in the art, and require one, or a plurality of winning lines to make a win determination after a spin. Similarly, a reel type video slot machine includes a plurality of symbols that are mapped on the periphery of a plurality of simulated rotating reels that form a playfield of m columns, and n rows. The reels are randomly stopped, and a win decision is made based on the combination of symbols occurring at one, or a plurality of winning lines (also known as pay lines). Further, the number of reels employed varies from one reel per column to an individual reel for each playing position.

Another type of slot machines eliminates pay lines, and defines a winning combination based on the multiple occurrence of a symbol at any location at consecutive reels, rather than at a particular pay line that spans the reels (see U.S. Pat. No. 6,093,102).

For a five reel video slot machine that does not employ pay lines, and which uses 3 playing positions per reel, the player is required to bet a wager for each reel selected. For the first wager, the playfield normally consists of a horizontal line that spans the middle positions of all five rotating reels, in addition to the two visible playing positions of the first reel. Upon depositing a second wager, the playfield is expanded to include the remaining two visible playing positions for the second reel. A third wager expands the play field to include the two remaining visible playing positions of the third reel, etc. For the five reel machine, when a player deposits five wagers, the entire playfield, which includes 15 playing positions, is activated. Normally, the activation of the playfield is done sequentially from left to right, and is based on the amount of wager deposited. The player has also the option to place a maximum bet, and in such case the entire playfield is activated with multiple wagers per reel. A winning outcome includes the occurrence of three of a kind, four of a kind, five of a kind, etc. In a winning combination a symbol must be present at consecutive reels starting at the first reel at the left of the playfield.

The above described slot machine has two main limitations. It is still constrained by the configuration of fixed rotating reels for the definition of an active playfield. Further, a winning combination of symbols must be contiguous. The slot machine described in this invention is independent of rotating reels configurations for the definition of a playfield, and enables a player to partially define an active playfield as a subset of any playfield that consists of a plurality of playing positions. Further, because each playing position is independent of the remaining positions, i.e. is not constrained by a reel configuration, a winning combination of symbols does not have to be contiguous.

OBJECT OF THE INVENTION

Because it is desirable to offer players new slot machines, it is an object of this invention to provide a slot machine that does not employ winning lines for the determination of winning combinations of symbols.

It is also an object of this invention to provide a slot machine that enables a player to manually select an active playfield from a playfield that is defined by a plurality of playing positions.

It is further an object of this invention to provide a slot machine that enables a player to randomly select an active playfield from a playfield that is defined by a plurality of playing positions.

It is still an object of this invention to provide a slot machine with a playfield defined as a plurality of playing positions, wherein each playing position is controlled by a separate reel, and wherein a plurality of reels are randomly assigned to playing positions during each spin.

It is yet an object of this invention to provide a slot machine with a playfield defined as a plurality of playing positions, wherein each playing position is randomly mapped to a visible position on a rotating reel during each spin.

It is also an object of this invention to provide a slot machine with a playfield defined by a plurality of playing positions, wherein each playing position can indicate a plurality of symbols, and wherein the selection of a symbol to be displayed at a playing position is based on random assignment, and manipulation of binary numbers to playing positions.

It is a further object of the present invention to provide a slot machine with a playfield defined by a plurality of playing positions, wherein said playing positions are subdivided into a plurality of groups, and wherein the configuration of the groups is different for each spin.

It is yet an object of this invention to provide a slot machine with a playfield defined by a plurality of playing positions, wherein said playing positions are subdivided into a plurality of groups, and wherein at least one group is manually selected by the player.

It is also an object of this invention to provide a slot machine with a playfield defined by a plurality of playing positions, wherein said playing positions are subdivided into a plurality of groups, and wherein at least one group is randomly selected at each spin.

It is a further object of the present invention to provide a slot machine with a playfield defined by a plurality of playing positions, wherein said playing positions are subdivided into a plurality of groups, and wherein a winning combination of symbols includes the repeated occurrence of a particular symbol at playing positions in different groups.

It is still an object of this invention to provide a slot machine with a playfield defined by a plurality of playing positions, wherein said playing positions are subdivided into a plurality of groups, and wherein a "wild" symbol is used and can be substituted by other symbols when determining a winning combination of symbols.

It is yet another object of this invention to provide a slot machine with a playfield defined by a plurality of playing positions, wherein said playing positions are subdivided into a plurality of groups, and wherein the slot machine employs a bonus game that is triggered by the repeat occurrence of an associated symbol at playing positions in different groups.

It is also an object of this invention to provide a bonus game for a conventional reel type video slot machine, wherein the bonus game employs a plurality of playing positions that are randomly mapped to the playfield of the conventional machine, and wherein said playing positions are subdivided into a plurality of groups, and wherein a winning combination of symbols includes the repeated occurrence of a particular symbol at playing positions in different groups.

It is a further object of this invention to provide a slot machine, which incorporates a variety of visual and audible indications to heighten the enjoyment of play.

SUMMARY OF THE INVENTION

The foregoing and other objects of the invention are accomplished by a slot machine that has a plurality of playing positions, wherein each playing position has an indicator to display one of a plurality of symbols. It is preferable that said plurality of playing positions is arranged in circular, or other geometric configurations. However, the playfield could also be configured as a two dimensional array of playing positions. The slot machine does not employ winning lines, or reels, for the determination of winning combinations of symbols. Rather, the active playfield is subdivided into a plurality of groups, wherein each group includes one or a plurality of playing positions. The size of the active playfield, i.e. the number of playing positions included in the active playfield is determined by the amount of wager deposited by the player.

The player is provided with input control mechanism to manually select at least the playing positions for the first group, which is also defined as the "key" group. The remaining groups could also be manually selected by the player, or preferably could be randomly selected. Alternatively, all groups could be randomly selected for each spin. Each group is graphically distinguished from the other groups using either different colors or different geometric shapes. The symbols occurring at playing positions within the key group are defined as "key" symbols. A winning combination of symbols is then defined to include the repeated occurrence of a "key" symbol at playing positions in a plurality of groups.

The slot machine includes a mechanism that randomly generates symbols for each spin. Such mechanism could be in the form of a plurality of rotating reels that employ a plurality of playing positions per reel. After each spin, the occurring symbols are randomly mapped into the playing positions of the various groups. The rotating reels could be hidden from the player, or could be made visible such as in the case where the present invention is implemented as a bonus game in a conventional reel type mechanical or video slot machine.

In accordance with a preferred embodiment of the invention, the slot machine is of the video type, and includes a screen with a playfield that consists of fifteen playing positions. The screen could be implemented using a cathode ray tube (CRT), a liquid crystal display (CRT), a digital light processor (DLP) display, or using plasma or other type of display technology. Each playing position has an indicator that provides a visual display of randomly generated symbols. The slot machine employs five rotating reels that generate 15 symbols for each spin or game. The generated symbols are then randomly assigned to the fifteen playing positions. It is a design choice to make the five rotating reels visible or hidden from the player. An alternate mechanism to randomly generate the symbols is to use an individual reel for each playing position. While, the use of such individual reels makes the playing positions independent of each other, a designer may elect to use an algorithm that randomly assigns the individual reels to the playing positions for each spin. A third mechanism that could be employed to randomly generate symbols is based on the concept of random assignment and manipulation of binary numbers as disclosed in U.S. patent application Ser. No. 10/917,129.

At the start of a game, the player is requested to manually select three playing positions that define the "key" group. The preferred embodiment employs touch screen controls, which enables a player to select such "key" playing positions by simply touching the screen at the selected positions. A plurality of push buttons or a mouse control mechanism could also be used to manually select the playing positions of the "key" group.

The fifteen (15) playing positions of the preferred embodiment are subdivided into five (5) groups, and each group has three (3) playing positions. The groups are visually distinguishable from each other on the screen using different colors. Similar to conventional machines, the player is also requested to deposit a wager for the game. The amount of the wager deposited determines the number of active playing positions on the playfield for the game. A minimum wager, defined as a single unit wager, activates seven (7) playing positions that include the three positions of the "key" group, and four (4) positions configured as a single position from each of the remaining four groups. In the preferred embodiment, the three "key" playing positions are manually selected by the player, while the remaining four (4) positions are randomly selected.

Upon the deposit of a second single unit wager, the active playfield is expanded from seven (7) to nine (9) playing positions. The additional two positions are randomly selected from the available eight (8) positions at the four (non "key") groups. There are no restrictions on the selection of these additional two positions. The positions could be selected at a single group, or at two different groups. Upon the deposit of a third unit wager, the playfield is extended by another two playing positions that are randomly selected from the remaining six (6) positions. Similarly, the deposit of a fourth unit wager expands the active playfield to 13 by randomly selecting two additional playing positions from the remaining four (4) positions. To activate the entire playfield of fifteen (15) playing positions, the player must deposit five (5) unit wagers. In such a case all three positions of each of the five groups become active. Also, if a player elects to make a maximum bet, i.e. multiple unit wagers per group, then all playing positions are activated.

In the preferred embodiment, a winning combination of symbols includes the multiple occurrence of a "key" symbol at active playing positions located at a plurality of groups. A "key" symbol is a symbol that occurs at a playing position in the "key" group. After a spin, the microprocessor that controls the slot machine first determines the "key" symbols associated with the spin then it determines if a win combination has occurred. The preferred embodiment, also, employs a "wild" symbol that could be substituted by a "key" symbol if occurred at an active playing position in a non "key" group. The microprocessor could be programmed such that the "wild" symbol does not occur at the "key" group. Further, the preferred embodiment employs a bonus game that includes one or a plurality of free spins. The bonus game is activated when an associated symbol occurs at a playing location at the "key" group, and at least at two other active locations in two different groups.

Because there are no restrictions placed on the selection of the key playing positions, or the remaining active positions, a winning combination of symbols does not have to be contiguous. However, a winning combination of symbols must include a symbol from a playing position at the "key" group.

It should be noted that the use of a single "key" group is disclosed for the purpose of describing the preferred embodiment, and is not intended to limit the invention herein. As would be appreciated by a person skilled in the art, a game designer my elect to use a plurality of "key" groups. For example two key groups identified as a first key group, and a second key group could be used. In such a case, the first key group determines the "key" symbols for a spin. The second key group must include a "key" symbol from the first key group in order for a winning combination to occur.

The present invention could, also, be implemented as a bonus game in a conventional reel type mechanical or video slot machine. A video type slot machine with a bonus game could be implemented using two screens. The lower screen indicates the rotating reels, and is activated upon the deposit of a wager and the activation of the start button. The conventional slot machine could employ winning lines, or could be of the type described in U.S. Pat. No. 6,093,102. Similar to other bonus games, a bonus game using the concepts disclosed herein is triggered by the occurrence of a plurality of an associated symbol at an active pay line, or at a plurality of contiguous reels. A bonus game could consist of a plurality of free spins. Prior to each free spin, the player is requested to select three playing positions for the key group on the upper screen. The microprocessor that controls the slot machine then randomly configures the remaining groups, which are identified in different colors on the upper screen. Then upon the completion of a free spin, the occurring symbols at the lower screen are randomly mapped to the playing positions of the upper screen. A winning determination is then made based on the "key" symbols of the "key" group.

BRIEF DESCRIPTION OF THE DRAWINGS

These and other more detailed and specific objectives will be disclosed in the course of the following description taken in conjunction with the accompanying drawings wherein.

DESCRIPTION OF THE PREFERRED EMBODIMENT

Figure 1:
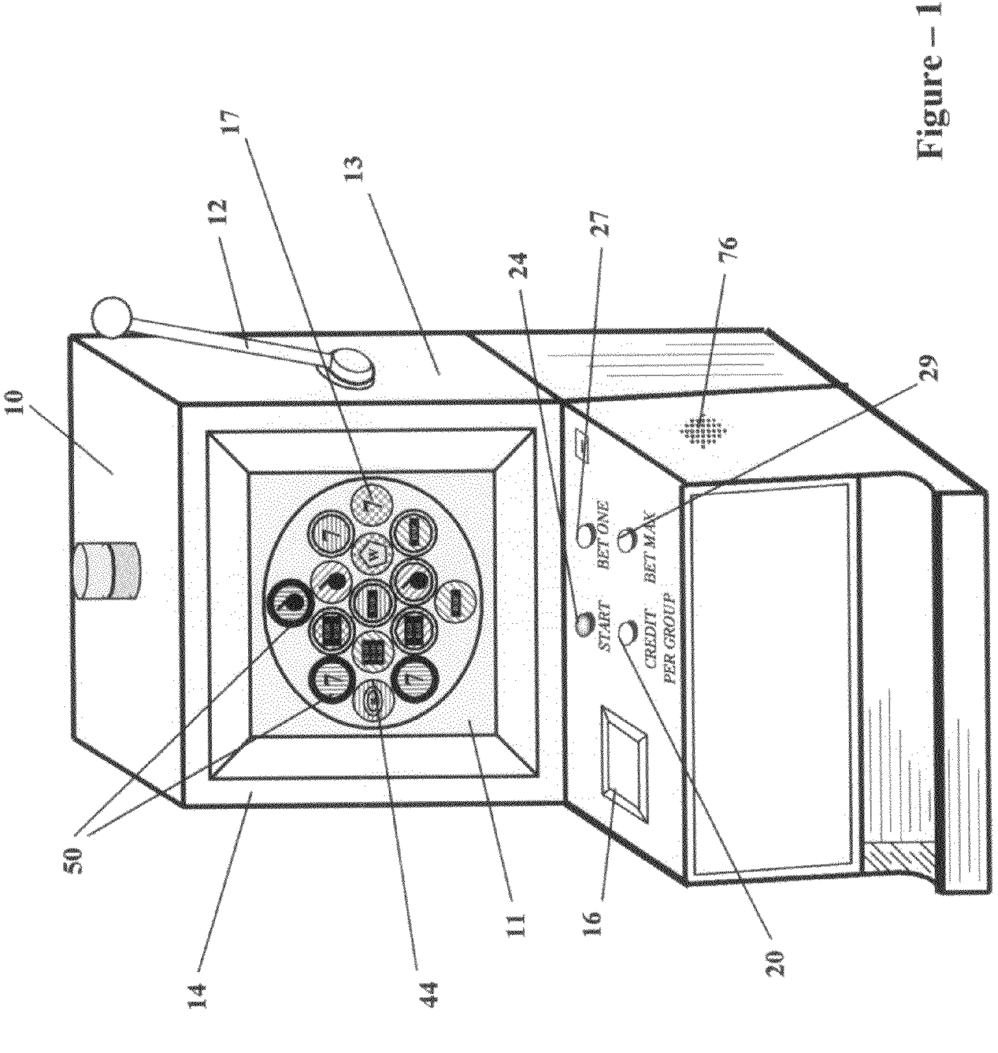
FIG. 1 is a perspective view of the preferred embodiment of a slot machine according to the invention.
Figure 5:
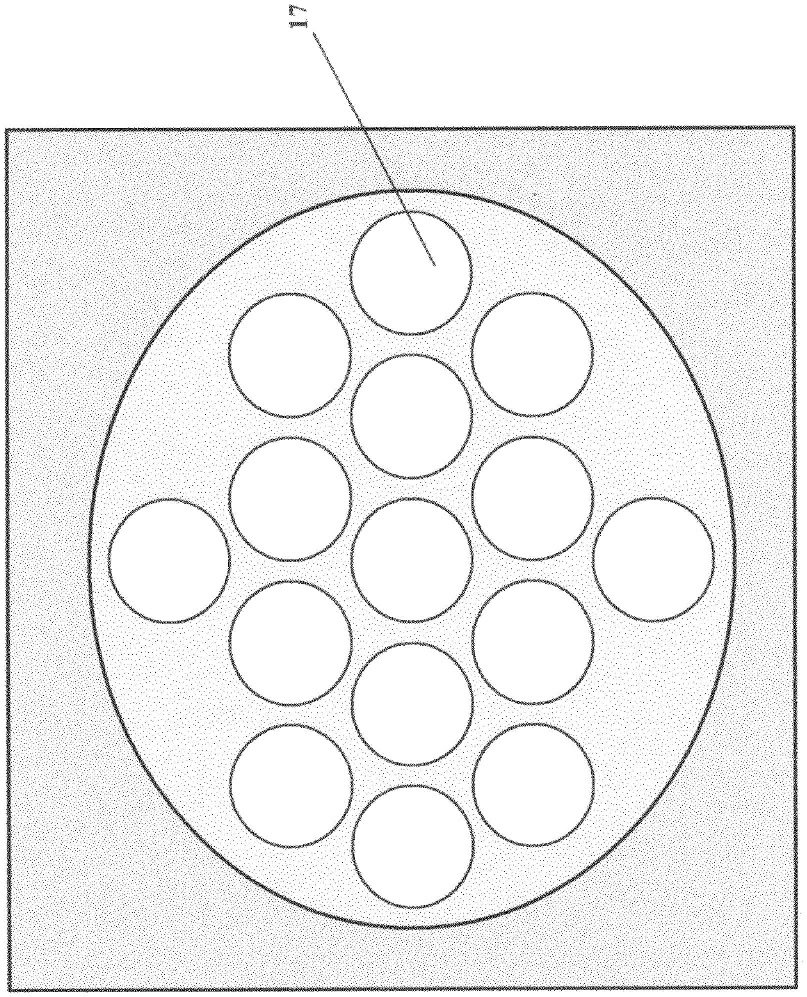
FIG. 5 indicates the 15 playing positions of the preferred embodiment.
Figure 6:
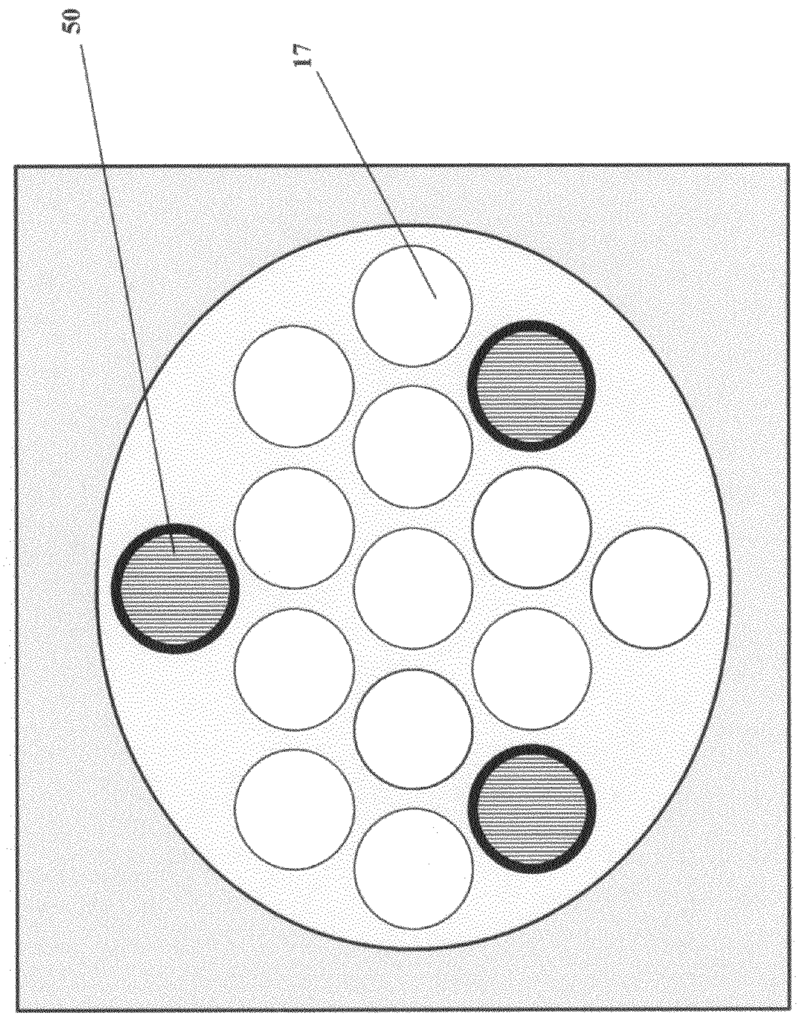
FIG. 6 shows an example of a key group that includes 3 playing positions in the preferred embodiment.
Figure 7:
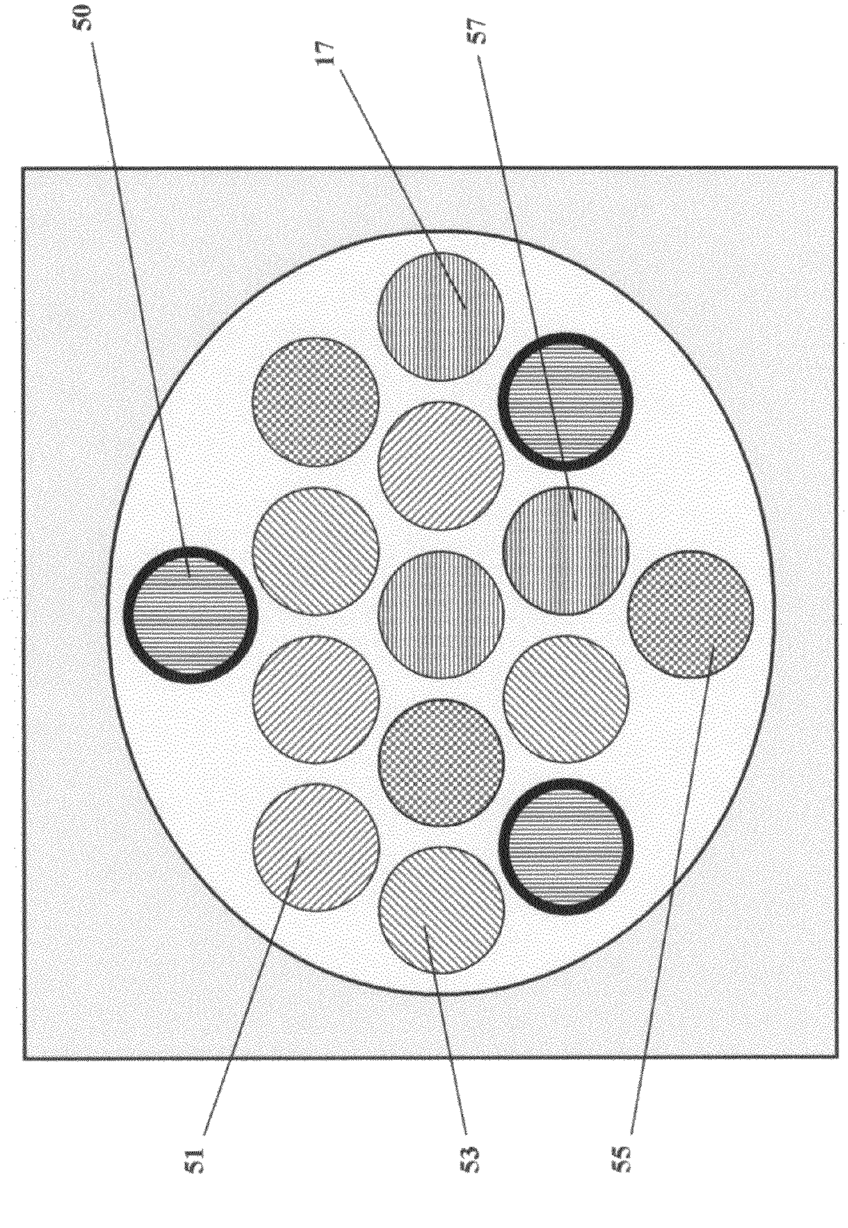
FIG. 7 shows an example of a group configuration for the playing positions, indicating the key group, and the remaining four groups in different colors.

Referring now to the drawings where the illustrations are for the purpose of describing the preferred embodiment of the invention and are not intended to limit the invention hereto, FIG. 1 is a front prospective view of a slot machine 10, which is comprised of a housing 13 having a face 14 and a video screen 11 that indicates a playfield with fifteen (15) playing positions 17. The playing positions are configured as five (5) rows of playing positions such that the top row includes one playing position, the second row includes four (4) playing positions, the third row includes five (5) playing positions, the fourth row includes four (4) playing positions, and the bottom row include a single playing position. This configuration is also shown in FIG. 5. Prior to each spin, the player is required to select three (3) playing positions to define the "key" group 50 for the spin. An example of a key group is shown in FIG. 6, where the playing positions of the key group are indicated by a solid ring around each playing position. The remaining playing positions are then randomly configured into four (4) additional groups as shown in FIG. 7. The additional four groups 51, 53, 55 & 57 are distinguished from each other using different colors.

It should be noted that the number of playing positions in the playfield, and the above described configuration of the playfield are set forth for the purpose of describing the preferred embodiment, and are not intended to limit the invention herein. As would be appreciated by a person skilled in the art, any configuration of the playing positions could be used. Because the current invention does not employ pay lines, a winning combination of symbols does not have to be contiguous.

The slot machine 10 has conventional controls including an activation lever 12, a start button 24, "BET ONE" 27, "BET MAX" 29 and "CREDIT PER GROUP" 20 buttons. Further, the preferred embodiment includes a Liquid Crystal Display (LCD) screen 16, which provides game information to the player that includes the number of groups selected, coins per group, number of coins won, and balance of remaining coins or credit. In addition, the preferred embodiment employs a touch screen control mechanism 44 to enable a player to select the playing positions of the "key" group.

Figure 2:
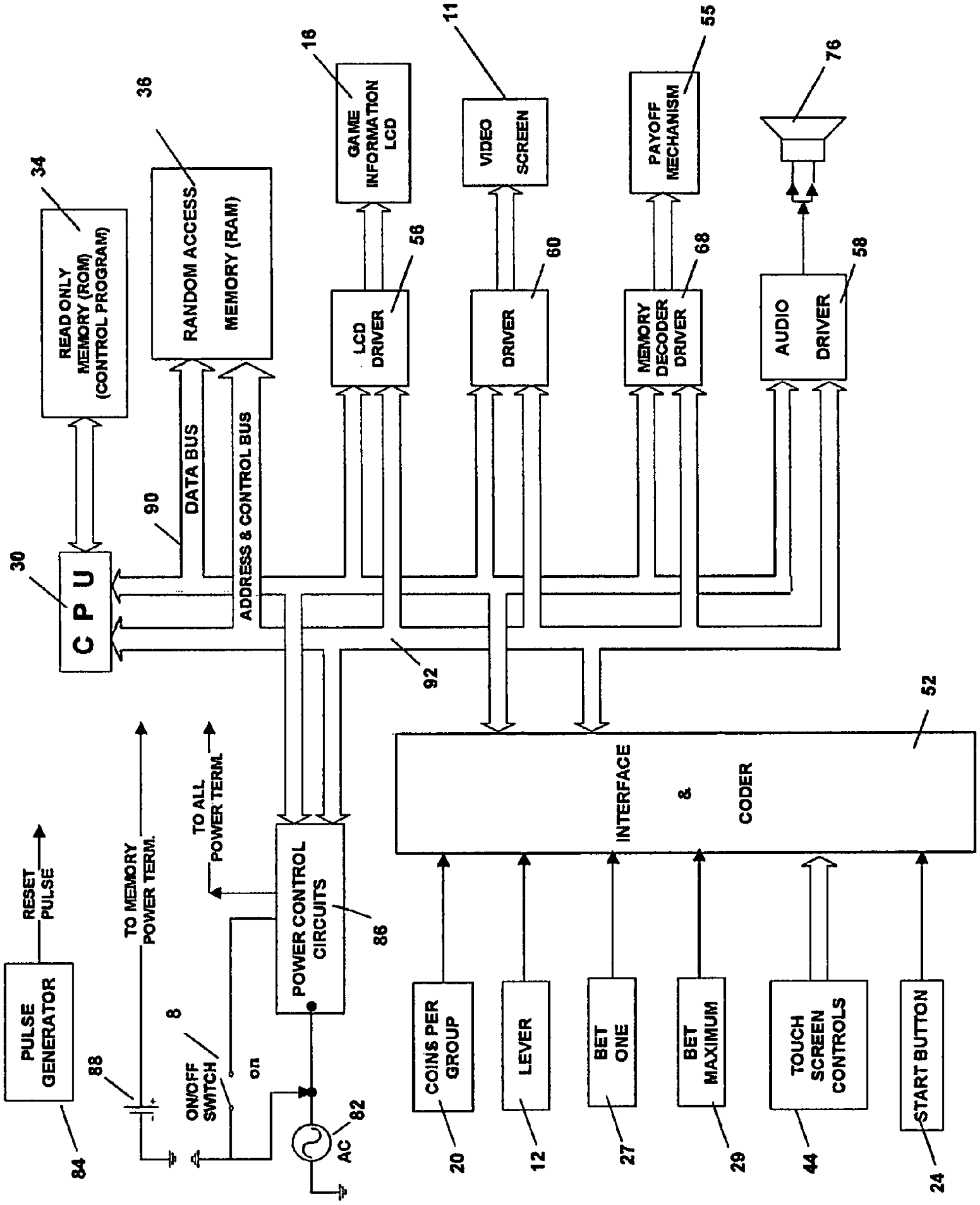
FIG. 2 indicates a block diagram of the microprocessor circuitry used to control the slot machine according to the invention.

A block diagram of the control circuitry to operate this gaming device 10 is illustrated in FIG. 2. This block diagram includes a micro-controller with a central processing unit (CPU) 30 and system memory. The system memory preferably comprises a separate read-only memory (ROM) 34 and battery-backed random-access memory (RAM) 36. It will be appreciated, however, that the system memory may be implemented on any of several alternative types of memory structures or may be implemented on a single memory structure. For example, the read-only memory 34 may be replaced or supplemented with a mass storage unit such as a removable flash memory or a hard drive. The system memory is used to store game-related data associated with the chance games played on the slot machine. The game-related data may, for example, include game code, math tables, a random number generator, and audio resources.

An on/off toggle switch 8 is provided to control the operational state of the slot machine and the connection of the external AC power supply 82 to the electric circuitry. Also, an interface and coding device 52 is used as an input interface between the various control elements and the CPU 30. These control elements include the touch control mechanism 44 of the video screen 11, main lever switch 12, "BET ONE" switch 27, "BET MAX" switch 29, "START" button 24, "CREDIT PER GROUP" switch 20 and other conventional control elements of a slot machine. Similarly an LCD control driver 56, and an audio driver 58 are used to interface the LCD screen 16, which provides game information, and the audio circuits that activate the loudspeaker 76, with the CPU 30. Also, a driver 60 is used to interface the video screen 11 with the CPU 30. A common address and control bus 92, and a separate common data bus 90 are used to interconnect the central processing unit 30 with the interface and coding device 52, the video driver 60, the LCD driver 56, the audio driver 58, the read only memory (ROM) 34, and the random access memory (RAM) 36.

Similar to conventional slot machines, the player is required to deposit a wager prior to the start of a game or a spin. The player can proceed to deposit a wager for a game using traditional control switches that include "BET ONE" 27, "BET MAX" 29, and "CREDIT PER GROUP" 20 buttons.

Figure 8:
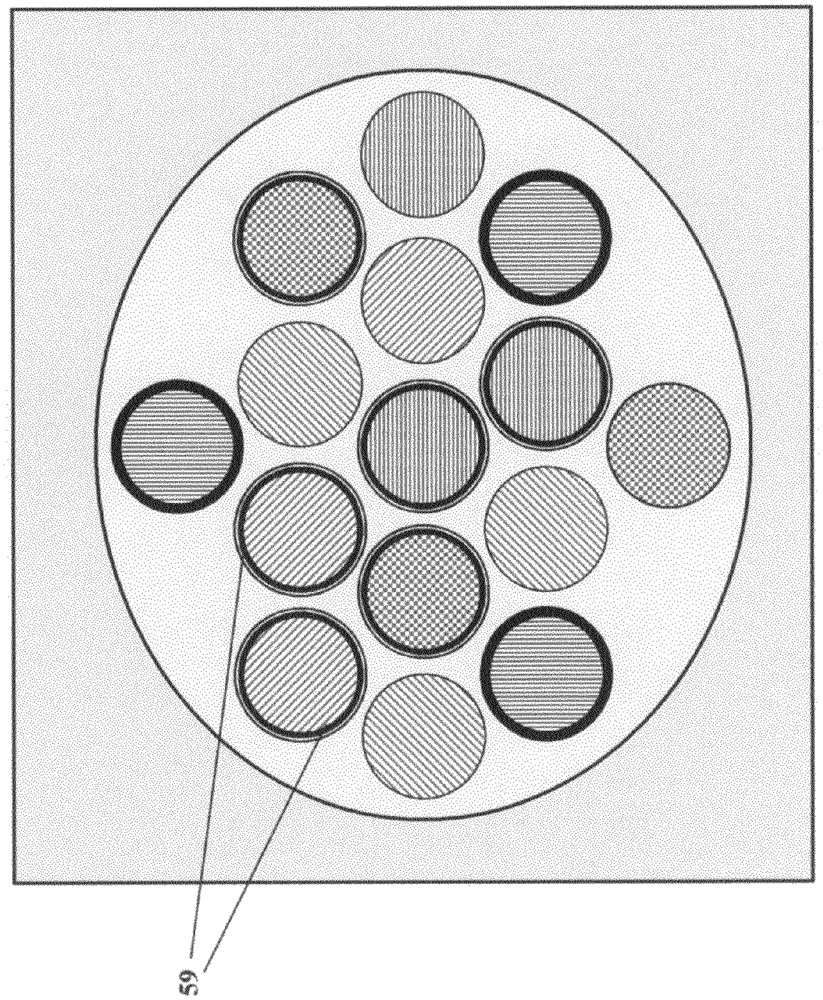
FIG. 8 shows the example of FIG. 7 with the active playing positions indicated by a ring around each position.

After depositing a wager, the player is instructed to select the three playing positions for the key group 50 using the touch screen controls 44. Then upon such manual selection of the playing positions for the key group 50, the CPU 30 executes a segment of the game code, which controls the operation of the slot machine, to randomly select and identify the playing positions for the remaining four (4) groups. A segment of the game code also identifies to the player the active playing positions for the game based on the amount of wager deposited by the player. A minimum wager activates seven (7) of the fifteen (15) playing positions. The seven activated positions include the three positions of the key group, and four positions selected at random from the remaining four groups (one per group). Each additional wager expands the playfield by two positions that are selected at random from the remaining playing positions. FIG. 8 shows a group configuration with nine (9) playing positions activated. The activated playing positions are indicated using a double ring around each playing position.

The preferred embodiment employs five (5) simulated rotating reels to generate random symbols for each game. The rotating reels are used in conjunction with three lines, each of which crosses the five rotating reels. However, these lines are not pay lines. They are rather used to generate symbols for each spin. It should be noted that, in the preferred embodiment, the rotating reels and associated lines are not visible to the player.

Figure 9:
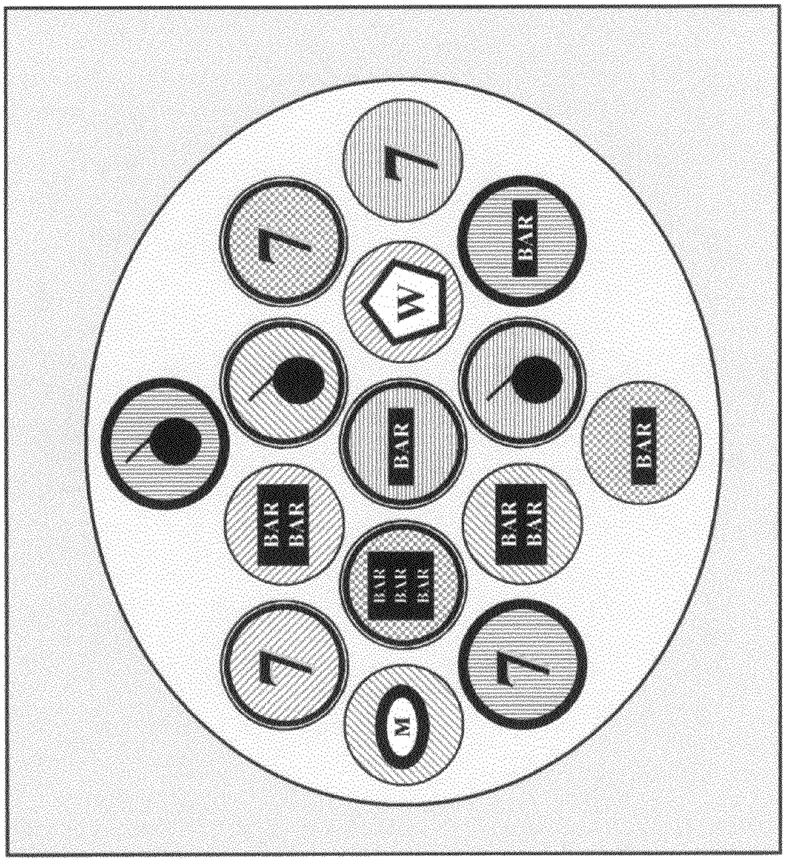
FIG. 9 shows the example of FIG. 7 after the random assignment of generated symbols to playing positions.
Figure 10:
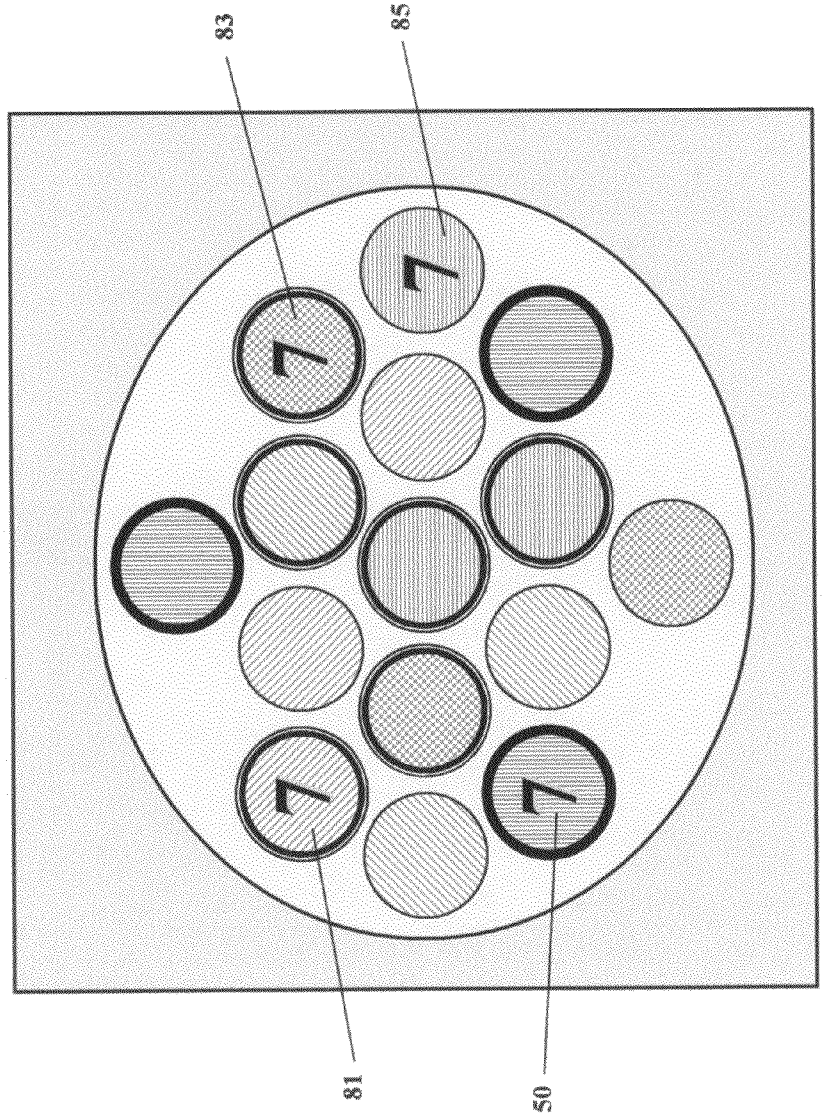
FIG. 10 shows an example of a winning combination of symbols of a slot machine according to the invention.

After the configuration of the playfield into groups, and after indicating to the player the active playing positions, the player is required to initiate a game or a spin by activating the main lever 12, or the "START" button 24. Upon such activation the microprocessor executes a segment of the control logic that initiates the starting and stopping of the simulated reels, and the random generation of 15 symbols (3 symbols per reel, one at each line). Then the microprocessor executes a segment of the game code control logic that randomly assigns the generated symbols to the fifteen positions 17. FIG. 9 shows an example of a random assignment of generated symbols to the fifteen (15) playing positions of the preferred embodiment. Thereafter, the CPU 30 executes a segment of the game code control logic that determines if one or more winning combinations of symbols occurred at the active playfield. A winning combination of symbols is based on the multiple occurrence of a "key" symbol at a plurality of playing positions. A "key" symbol for a game is defined as a symbol that occurs at a playing position in the "key" group. FIG. 10 shows an example of a winning combination wherein the Lucky "7" is a "key" symbol that occurred in three (3) groups 81, 83 & 85 in addition to the "key" group 50 resulting in a four of a kind. However, because one of the playing positions where the Lucky "7" is assigned 85 has not been activated, the winning combination is a three of a kind.

Further, the CPU 30 selectively accesses the audio resources to be played through one or more audio speakers 76 mounted to a housing of the slot machine. If the outcome after the random assignment of the generated symbols corresponds to a winning combination outcome identified on a pay table, then the CPU 30 instructs a payoff mechanism 55 to award the player a payoff for that winning outcome combination in the form of coins or credits.

Referring again to FIG. 2, in order to operate the gaming device, the ON-OFF switch 8 should be activated from the "off" position to the "on" position, which causes power to be supplied from the main external power supply 82 to the power control circuits 86, which in turn energizes all terminals of the gaming device 10. The gaming device also includes a rechargeable battery 88, which feeds the memory power terminals in order to ensure that critical data is not lost in the event of a loss of the external electrical supply 82.

It should be noted that the above description of the block diagram illustrated in FIG. 2, and using interface and coding devices, and memory decoding devices, is being provided for the purpose of describing the preferred embodiment, and is not intended to limit the invention herein. As would be appreciated by a person skilled in the art, a game designer may elect a microprocessor that includes input and output ports to interface input switches, and output devices with the CPU. Such microprocessors are well known in the art.

Figure 3:
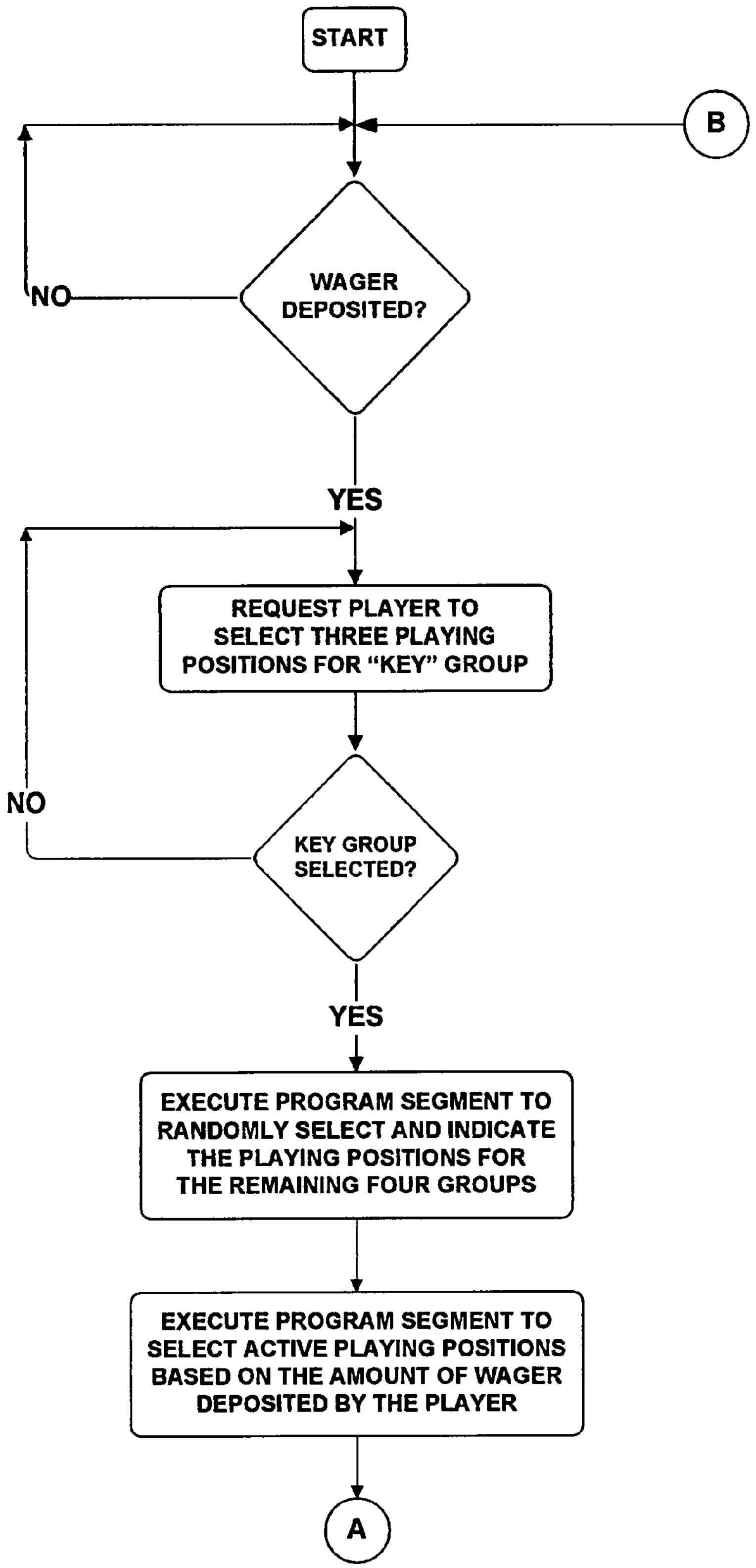
FIGS. 3-4 indicate a logical flow diagram that illustrates the main program functions performed by the microprocessor controlling the slot machine according to the invention.
Figure 4:
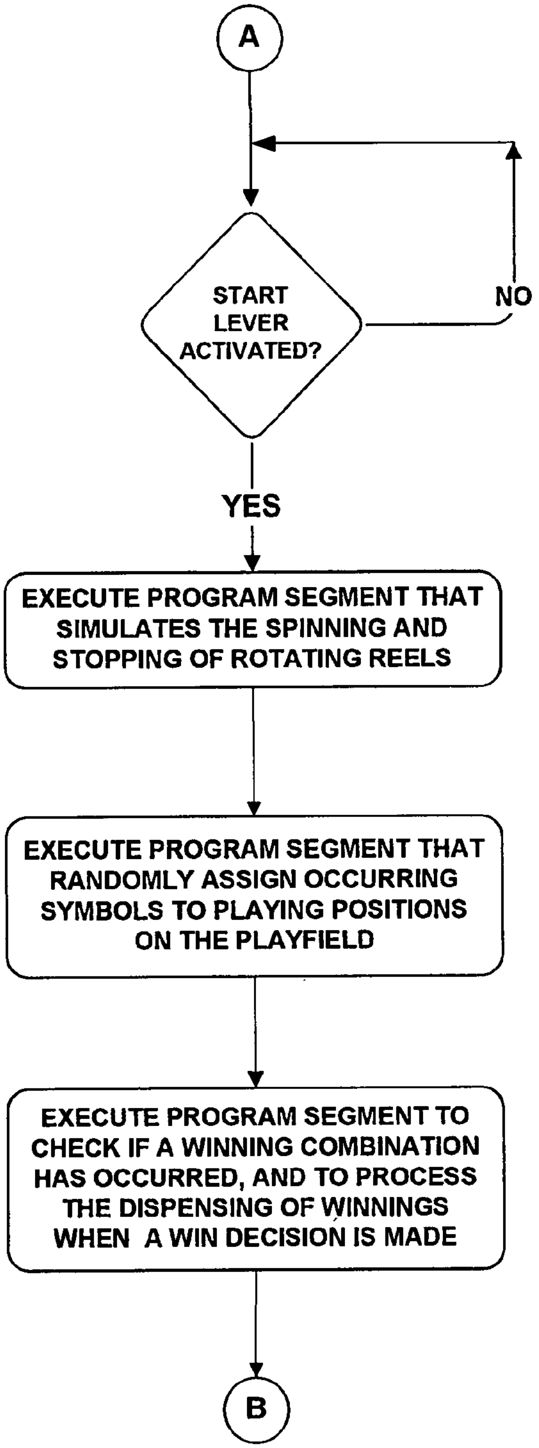

With respect to the operation of this gaming machine, the logic steps utilized are illustrated in flow diagram form in FIGS. 3-4, which interconnect with each other at the places shown in the various figures. Even though specific reference will not be made to this diagram in the following description of the operation of the slot machine, periodic reference to this diagram may prove to be helpful to the reader hereof.

Upon the activation of the "On-Off" switch 8, and the initialization of the program variables, the slot machine is ready to operate. The player is expected to deposit a wager, and select three positions for the "key" group using touch screen controls 44.

Once the player has deposited a wager, and selected the playing positions for the "key" group, the control logic program randomly configures the remaining playfield into four groups with three playing positions per group. The groups are indicated on the video screen, and are visually distinguishable from each other using different colors. The "key" group is identified by the color red. The remaining four groups are identified using the colors blue, green, yellow, and white. The identity of each playing position, i.e. which group it belongs to, is indicated by a colored ring around the perimeter of the position. Further, active playing positions are distinguished using a bright color that simulates the illumination of the positions.

Upon the activation of the "START" button 24, or the main lever 12, the microprocessor generates 15 symbols, and randomly assigns them to the playing positions of the playfield. Then the microprocessor determines if a win condition has occurred, and process such win condition by crediting the player an appropriate credit that corresponds to the resulting winning combination(s) of symbols.

Upon the completion of the control program segment that checks and processes winning combinations, the control program logic returns to the program segment that determines if the player has deposited a wager, and the above described process is repeated.

Figure 11:
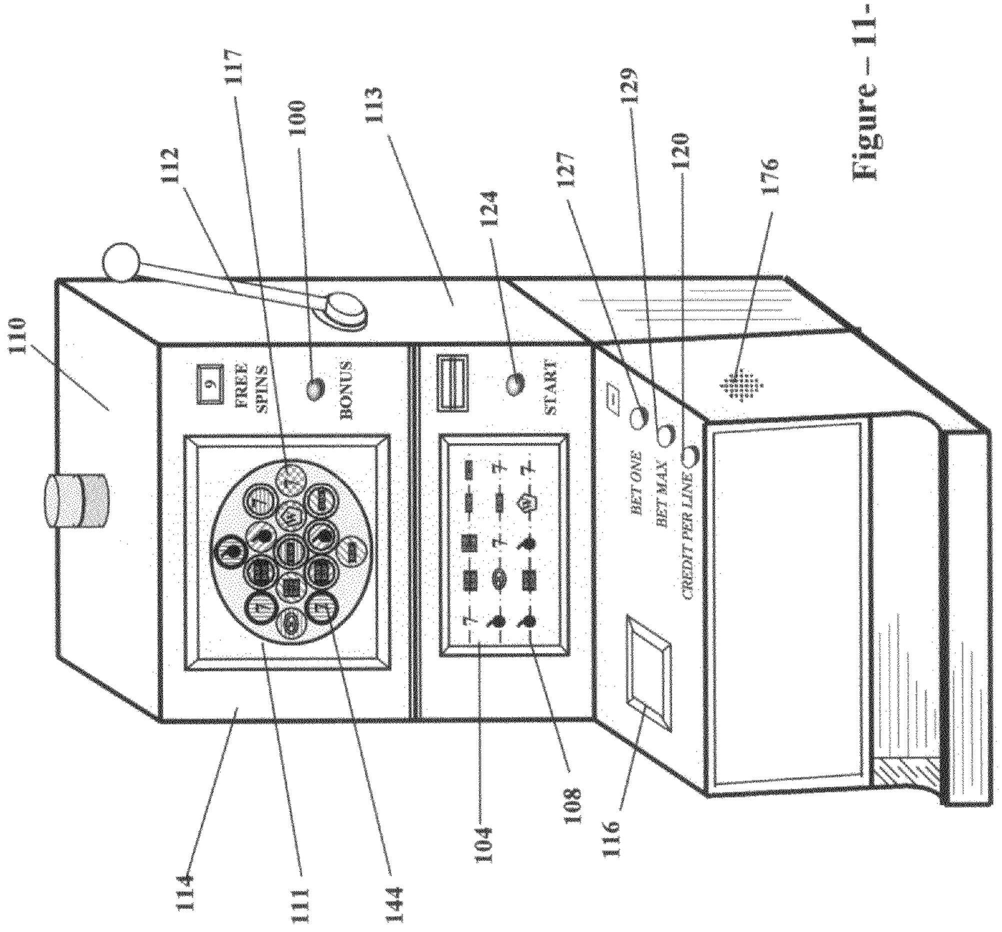
FIG. 11 shows a perspective view of an alternate embodiment that employs the present invention as a bonus game in a conventional reel type video slot machine.

The present invention could also be implemented as a bonus game on a conventional reel type slot machine. Referring to the drawings where the illustrations are for the purpose of describing an alternate embodiment of the invention, and are not intended to limit the invention hereto, FIG. 11 is a front prospective view of a conventional reel type slot machine 110, which is comprised of a housing 113 having a face 114 and a first video screen 104 that indicates five simulated rotating reels with three (3) pay lines 108. The slot machine 110 has conventional controls including an activation lever 112, a start button 124, "BET ONE" 127, "BET MAX" 129 and "CREDIT PER LINE" 120 buttons. Further, the alternate embodiment includes a Liquid Crystal Display (LCD) screen 116, which provides game information to the player that includes the number of lines selected, coins per line, number of coins won, and balance of remaining coins or credit. The machine operates as a conventional slot machine until a bonus game is triggered when an associated symbol occurs at three contiguous playing positions on a selected pay line 108. The bonus game includes a plurality of free spins, which are initiated upon the activation of the bonus button 100.

The alternate embodiment includes a second video screen 111, with fifteen (15) playing positions 117. Prior to each free spin, the player is requested to select three playing positions to define the "key" group on the upper screen 111, using a touch screen control mechanism 144. The microprocessor that controls the slot machine then randomly configures the remaining playing positions of the upper screen 111 into four (4) groups. The microprocessor also activates a plurality of playing positions on the upper screen 111 based on the number of pay lines activated by the player in the underlying conventional game. If the player had activated one pay line in the underlying game, then the microprocessor will activate seven (7) playing positions in the upper screen 111 for the bonus game. The seven playing positions include the three positions selected by the player for the "key" group, and four (4) other playing positions selected at random from the remaining four (4) groups. This random selection is such that one playing position is selected at each non-key group.

Similarly, if the player had activated two (2) lines in the underlying game, then the microprocessor will activate eleven (11) playing positions at the upper screen 111 for the bonus game. These eleven (11) playing positions include the three playing positions selected by the player for the "key" group. Further, if the player had selected all three pay lines of the underlying game, then the microprocessor will activate all fifteen (15) playing positions of the upper screen 104 for the bonus game.

Upon the completion of a free spin, the occurring symbols at the three pay lines 108 of the lower screen 104 are randomly mapped to the playing positions 117 of the upper screen 111. A winning determination is then made based on the "key" symbols of the "key" group. The number of credits or coins per line deposited by the player for the underlying game is used to calculate the amount of a win in the bonus game. This process is repeated for each free spin in the bonus game.

As will be understood by those skilled in the art, many different programs may be utilized to implement the flow charts disclosed in FIGS. 3 & 4. Obviously these programs will vary from one another in some degree. However, it is well within the skill of the computer programmer to provide particular programs for implementing each of the steps of the flow charts disclosed herein. It is also to be understood that the foregoing detailed description has been given for clearness of understanding only and is intended to be exemplary of the invention while not limiting the invention to the exact embodiment shown. Obviously certain modifications, variations and improvements will occur to those skilled in the art upon reading the foregoing. It is, therefore, to be understood that all such modifications, variations and improvements have been deleted herein for the sake of conciseness and readability, but are properly within the scope and spirit of the following claims.

What is claimed and desired to be secured by Letters of Patent is:

1. A gaming device for presenting a game, the gaming device comprises:

means for providing a display with a plurality of display positions, means for configuring the display positions into a plurality of groups, wherein the configuration of display positions into groups can be different for different spins of the game, means for generating visual symbols, and assigning said generated symbols to display positions, means for selecting one of said plurality of groups as a key group, wherein at least one of the symbols assigned to the key group is defined as a key symbol, and means for determining if a winning combination of symbols has occurred based on the combination of said key symbol and symbols assigned to other groups.

2. A gaming device as recited in claim 1, further comprising a housing.

3. A gaming device as recited in claim 1 wherein the display is provided on a screen.

4. A gaming device as recited in claim 1 wherein the configuration of the display positions into groups is done at least partially at random.

5. A gaming device as recited in claim 1 wherein the configuration of the display positions into groups is done manually by the player.

6. A gaming device as recited in claim 1, wherein the means for generating symbols includes a plurality of simulated rotating reels that are randomly stopped at a plurality of lines.

7. A gaming device as recited in claim 1, wherein the means for generating symbols includes a simulated reel for each display positions.

8. A gaming device as recited in claim 1, wherein the assignment of generated symbols to the display positions is random.

9. A gaming device as recited in claim 1, wherein a winning combination of symbols is based on the repeated occurrence of a key symbol in a plurality of groups.

10. A gaming device for presenting a game, the gaming device comprises:

a display with a plurality of display positions, a microprocessor with a computer-readable medium encoded with a computer program to control the operation of the gaming device, a plurality of input control switches to enable a player to interact with the gaming device, a computer program segment that configures display positions into a plurality of groups, wherein the configuration of display positions into groups can be different for different spins of the game, a computer program segment that generates visual symbols, and assign said generated symbols to display positions, a computer program segment that selects one of said plurality of groups as a key group, wherein at least one of the symbols assigned to the key group is defined as a key symbol, and a computer program segment that determines if a winning combination of symbols has occurred based on the combination of said key symbol and symbols assigned to non-key groups.

11. A gaming device as recited in claim 10, further comprising a housing.

12. A gaming device as recited in claim 10, wherein said computer program segment that configures display positions into a plurality of groups is based on an algorithm that employs a random number generator.

13. A gaming device as recited in claim 10, wherein said computer program segment that generates and assigns symbols to display positions employs a plurality of simulated rotating reels that are randomly stopped at a plurality of lines.

14. A gaming device as recited in claim 10, wherein a winning combination of symbols is based on the repeated occurrence of a key symbol in a plurality of groups.

15. A gaming device for presenting a game, the gaming device comprises:

a display with a plurality of display positions, a microprocessor with a computer-readable medium encoded with a game code to control the operation of the gaming device, a plurality of input control switches to enable a player to interact with the gaming device, a game code segment that generates visual symbols using a plurality of reels that are randomly stopped at a plurality of lines, a game code segment that assigns the generated symbols to the display positions, a game code segment that configures the display positions into a plurality of groups, which include at least one key group, wherein said key group includes at least one symbol that is identified as a key symbol, and wherein the configuration of display positions into groups can be different for different spins of the game, and a game code segment that determines if a win has occurred based on a combination of symbols that includes a key symbol and symbols occurring at non-key groups.

16. A gaming device as recited in claim 15 further comprising a housing.

17. A gaming device as recited in claim 15, wherein the configuration of display positions into a plurality of groups is partially done by the player using input control switches.

18. A gaming device for presenting a game, the gaming device comprises:

a display with a plurality of display positions, a microprocessor with a computer-readable medium encoded with a game code to control the operation of the gaming device, a game code segment that generates visual symbols and assigns said generated symbols to display positions, an input control mechanism to enable a player to configure a plurality of display positions as a key group, wherein said key group includes at least one key symbol, and wherein the player can configure different display positions as a key group in different spins of the game, a game code segment that configures the remaining playing positions into a plurality of groups, and a game code segment that determines if a win has occurred based on a combination of symbols that includes a key symbol and symbols occurring at non-key groups.

19. A gaming device as recited in claim 18 further comprising a housing.

20. A gaming device as recited in claim 18, wherein the input control mechanisms includes a plurality of touch screen control switches.

21. A gaming device as recited in claim 18, wherein the input control mechanism includes a mouse control device.

22. A bonus game for a reel type slot machine comprising:

a screen that provides a display with a plurality of display positions, means for configuring the display positions into a plurality of groups, wherein the configuration of display positions can be different for different spins of the bonus game, means for assigning visual symbols occurring at the pay lines of the underlying reel type slot machine to display positions, means for selecting one of said plurality of groups as a key group, wherein at least one of the symbols assigned to the key group is defined as a key symbol, and means for determining if a win has occurred based on a combination of symbols that includes a key symbol and symbols occurring at non-key groups.

23. A bonus game for a reel type slot machine, which is controlled by a microprocessor with a computer-readable medium encoded with a game code, comprising:

a screen that provides a display with a plurality of display positions, a game code segment that configures the display positions into a plurality of groups, a game code segment that assigns visual symbols occurring at the pay lines of the underlying reel type slot machine to display positions, a game code segment that configures a key group of display positions, wherein at least one of the symbols assigned to the key group is defined as a key symbol, and wherein the configuration of display positions into a key group can be different for different spins of the bonus game, a game code segment that configures the remaining display positions into a plurality of groups, and a game code segment that determines if a win has occurred based on a predefined winning combination of symbols that includes a key symbol and symbols assigned to non-key groups.

24. A bonus game for a slot machine, which is controlled by a microprocessor with a computer-readable medium encoded with a game code, comprising:

a screen that provides a display with a plurality of display positions, a game code segment that configures display positions into a plurality of groups, wherein the configuration of display positions can be different for different spins of the game, a game code segment that assigns visual symbols generated at the underlying slot machine to display positions, a game code segment that identifies a key group of display positions, wherein at least one of the symbols assigned to the key group is defined as a key symbol, and a game code segment that determines if a winning combination of symbols has occurred based on the repeated occurrence of a key symbol in a plurality of groups.

25. A method for a gaming device for presenting a game, wherein the gaming device includes a display with a plurality of display positions, and a microprocessor with a computer-readable medium encoded with a game code that executes the following steps:

configuring said plurality of display positions into a plurality of groups, wherein the configuration of display positions into groups can be different for different spins of the game, generating and assigning a plurality of visual symbols to display positions, selecting one of said plurality of groups as a key group, wherein at least one of the symbols assigned to the key group is defined as a key symbol, and determining if a win has occurred for the game based on the repeated occurrence of a key symbol at display positions in a plurality of non-key groups.

* * * * *